Patented Dec. 25, 1923.

1,478,730

UNITED STATES PATENT OFFICE.

ROY H. BROWNLEE AND ROY H. UHLINGER, OF PITTSBURGH, PENNSYLVANIA.

SPECIAL CARBON BLACK.

No Drawing. Application filed March 9, 1922. Serial No. 542,463.

*To all whom it may concern:*

Be it known that we, ROY H. BROWNLEE and ROY H. UHLINGER, citizens of the United States, residing at Pittsburgh, in the county of Allegheny and State of Pennsylvania, have invented a new and useful Improvement in a Special Carbon Black, of which the following is a specification.

This invention relates to a special carbon black of thermal production possessing certain peculiar physical characteristics and qualities.

Carbon black as known commercially has previously been produced by the incomplete combustion of a suitable hydrocarbon gas, generally that naturally occurring mixture of hydrocarbon gases known as "natural" gas. In such processes for the production of carbon black the gas has been burned with a smoky flame against a metallic surface and subsequently collected therefrom.

Such carbon black, moreover, is formed by a process so wasteful that great governmental encouragement has been given any research work which might develop a process more economical of the natural gas which is the initial raw material. The combustion process has been, however, the only one in general commercial operation because with cheap natural gas its simplicity renders it economical from a commercial view point. Whereas the yield of carbon black by the partial combustion process is less than two pounds for a thousand feet of gas, as much as ten pounds of the carbon black constituting the subject matter of the present invention may be obtained from a thousand feet of gas.

In processes in which carbon black may have been formed as a by-product in the production of hydrogen; the carbon black has either remained unrecovered or if recovered has been in the form of hard and gritty lumps because of the cooking to which it has been subjected while in the furnace.

The carbon black previously produced commercially is a fluffy substance having a glossy black appearance. Such carbon black is difficult and unpleasant to handle because of its sooty character and because being fluffy it is impossible in using it to prevent an appreciable quantity being taken up by the air. It is also too bulky for convenient transportation or storage. Numerous methods have been attempted for the purpose of obviating these disadvantages alone.

The special carbon black of the present invention is the product of the method described and claimed in copending application Serial No. 542303, filed March 9, 1922.

According to such method the carbon black is produced thermally by subjecting a hydrocarbon, desirably a hydrocarbon gas such as "natural" gas to a decomposing temperature within a closed furnace or retort. In such furnace the hydrocarbon is subjected to the high temperature in the furnace for such a short period of time that the hydrocarbon is only partially decomposed, with the formation of a lean hydrocarbon gas and carbon black. It may be mentioned that the most desirable operating temperature for the furnace is from twelve hundred degrees C. to fourteen hundred degrees C., and that the hydrocarbon and the resulting gases and carbon black are subjected to such temperature for a period of from three to four seconds.

It is not all the carbon black produced by such decomposition that constitutes the carbon black of the present invention. It is only such of the carbon black as is formed thermally, and does not come into contact with the refractory material within the furnace, that is recovered as the desired special carbon black. Approximately two-thirds of the total quantity of carbon black produced is formed by the impingement of the hydrocarbon against the refractory material of the furnace, or comes into contact therewith after its formation and is subjected to a cooking within the furnace. Such carbon black is commercially valueless and is not recovered from the furnace.

Carbon black of "thermal" production, as the term is used herein, is carbon black formed by the disassociation of hydrocarbon molecules under the heating effect alone within the furnace, and not by any partial combustion of the hydrocarbon.

Such carbon black, as stated above, is passed rapidly from the furnace and is cooled quickly thereafter in order to prevent deterioration in its quality due to impingement of the particles of carbon while at a high temperature against any surface to which they may adhere.

As stated above, carbon black as hitherto produced is light, fluffy, and glossy black in color. The special thermally produced carbon black of the present invention is not fluffy and is gray in shade, presenting the appearance of being in a completely amorphous state.

The special thermally produced carbon black presents the further novel and advantageous quality of weighing approximately 2.5 times as much as an equal volume of the common commercial carbon black. In connection with the weight of the carbon black it may be noted that without compression a cubic foot of the special thermal carbon black weighs from twenty-five to thirty-five pounds, depending upon the degree to which it is shaken down and allowed to settle; while a cubic foot of the common commercial carbon black weighs without compression from ten to fourteen pounds, depending upon the degree to which it is shaken down. It is a noteworthy fact, however, that its true specific gravity is but little higher than that of common carbon black, its true specific gravity being approximately 1.9 while that of the common carbon black is 1.8. The specific gravity referred to is secured by immersing a quantity of carbon black which has been already weighed in air in a suitable liquid, such as kerosene, and referring the resulting displacement to the tabulated relation of such liquid to water as a standard for such purpose.

Carbon black of common production must be highly compressed in order that a given volume thereof may even approach the weigh of an equal uncompressed volume of the special carbon black of the present invention; and, even when most highly compressed, such carbon black lacks the advantages in use which arise from the peculiar physical qualities and condition of the special thermal carbon black.

The difference in weight is in itself of considerable importance as it renders the carbon black physically stable and lessens the bulk of an equal weight for transportation and storage. The carbon black of the present invention, because of its physical stability, is also much cleaner and easier to work with than the common commercial carbon black.

Other advantages arising from the peculiar physical qualities of the special thermal carbon black are well exemplified by its incorporation in rubber for the production of a composition rubber stock. This incorporation of carbon black in a composition rubber has become a common practice. This is because the carbon black toughens the rubber, increasing its tensile strength and rendering it less susceptible to injury by cutting and tearing. Such composition rubber is particularly desirable for use in the treads of automobile tires and for similar purposes in which the rubber is subjected to constant friction and the likelihood of injury.

The common commercial carbon black, however, presents the disadvantages that when incorporated in the rubber even in relatively small quantities it stiffens the rubber, detracting in a marked degree from its liveliness and resiliency. It also renders the operation of milling the rubber difficult, and prevents the rubber from flowing freely in a mold. When incorporated in a quantity in excess of fifteen per cent by volume of the raw materials it stiffens the rubber to such an extent that it is rendered practically unusable in the treads of pneumatic tires for solid tires.

The special carbon black on the contrary does not noticeably stiffen the rubber even if present in a quantity in excess of forty per cent by volume of the raw materials.

When samples of rubber, one containing common commercial carbon black and the other containing the special thermal carbon black, are compared, it is found that the sample containing the thermal carbon black is much softer and more pliable than the one containing the common carbon black. The sample containing the thermal carbon black also has a much greater elongation or stretch, and a much lower permanent set.

The physical structure of the special carbon black causes it to present marked advantages over the carbon black of commerce. One such characteristic is that the common carbon black is flocculent in mass, while the special carbon black is non-flocculent and obviously granular. It is apparently this physical difference which produces the different effect when the two forms of carbon black are incorporated in a foreign substance such as rubber. Thus the common carbon black may tend to "bunch" or remain in relatively small but agglomerated masses, while the physical particles of the special carbon black are capable of ready diffusion through a liquid or a plastic solid.

It has been established by experiment that the carbon black of the present invention differs in physical structure from the fluffy and glossy black carbon in that its ultimate particles are smaller in size than and of a different shape from the ultimate particles of such carbon. This in all probability is due partially to the fact that it is formed by the diassociation of carbon atoms from the hydrocarbon molecules and the union of such atoms to form solid carbon black; without the union of such number of atoms in a single particle, or such fusion of particles, as to produce carbon black in an agglomerated form. It is also due partially to the fact that the hydrocarbon is subjected to a high temperature for a short period of time, thus producing a carbon black of novel structure without producing one which might be considered to have suffered deterioration. It is as though the carbon black were subjected to heat for a period of time sufficiently longer than that of the combustion process to produce a different product, without such period of heating being so long continued as to produce an undesired waste product.

The ease and thoroughness with which the thermal carbon black may be diffused through and incorporated in solids other than rubber, renders it advantageous for incorporation in any solids in which carbon black may be desirably embodied as a filler.

The particular physical advantages of the carbon black of the present invention render it suitable for numerous other uses. For example, when used as a pigment in the manufacture of inks, paints, or the like, its thorough diffusion through the carrying liquid provides a product which flows freely and evenly and which is free from any lumpy particles.

It is true that the product of the present invention is primarily elemental from a chemical view point. It is also true, however, that it constitutes a new and useful product which is distinguished clearly by its physical properties from all generally similar products. While several distinctive characteristics, uses, and advantages of the special carbon black are known and appreciated, as stated above, it is highly probable that the carbon black possesses other and less obvious distinguishing characteristics and qualities, and is adapted to use for numerous other purposes.

What we claim is:

1. A special carbon black of thermal production presenting the distinguishing characteristic of a weight per unit volume approximately two and one-half times that of carbon black formed by the partial combustion of a hydrocarbon.

2. A special carbon black of thermal production presenting the distinguishing characteristic of a weight per unit volume in marked excess of that of carbon black formed by the partial combustion of a hydrocarbon with a true specific gravity approximately equal thereto.

3. A special carbon black of thermal production presenting the distinguishing characteristic of a weight per unit volume approximately two and one-half times that of carbon black formed by the partial combustion of a hydrocarbon in conjunction with a true specific gravity substantially equal thereto.

4. A special carbon black of thermal production presenting the distinguishing characteristic of a weight per unit volume in marked excess of that of carbon black formed by the partial combustion of a hydrocarbon.

5. A special carbon black of thermal production presenting the distinguishing characteristics that in unagglomerated mass it is of a non-flocculent granular nature, and that its ultimate particles are finer than and of different shape from the ultimate particles of flocculent carbon black.

6. A special carbon black of thermal production presenting the distinguishing characteristic that in mass it is of a non-flocculent nature and that its physical particles are capable of ready diffusion through liquids and plastic solids.

7. A special carbon black of thermal production presenting the distinguishing characteristic of a weight per unit volume approximately two and one-half times that of carbon black formed by the partial combustion of a hydrocarbon in conjunction with a true specific gravity bearing the ratio of 1.9 to 1.8 thereto.

8. A special carbon black of thermal production presenting the distinguishing characteristic of a weight per unit volume in marked excess of that of carbon black formed by the partial combustion of a hydrocarbon in conjunction with a true specific gravity bearing the ratio of 1.9 to 1.8 thereto.

9. A special carbon black of thermal production presenting the distinguishing characteristics that it is gray in color, of a non-flocculent nature, and that its ultimate particles are finer than and of different shape from the ultimate particles of flocculent carbon black.

10. A special carbon black of thermal production presenting the distinguishing characteristics that it is gray in color and has the property of ready diffusion through liquids and plastic solids.

11. A special carbon black of thermal production presenting the distinguishing characteristics that it is gray in color, non-flocculent in nature, and has the property of ready diffusion through liquids and plastic solids.

12. A special carbon black of thermal production presenting the distinguishing characteristic of a weight when uncompressed of from twenty-five to thirty-five pounds per cubic foot.

13. A special carbon black of thermal production presenting the distinguishing characteristics that it is gray in color and has a weight when uncompressed of from twenty-five to thirty-five pounds per cubic foot.

14. A special carbon black of thermal production presenting the distinguishing characteristics that it is of a non-flocculent nature and weighs when uncompressed from twenty-five to thirty-five pounds per cubic foot.

15. A special carbon black of thermal production presenting the distinguishing characteristics that it is gray in color, of a non-flocculent nature, and weighs when uncompressed from twenty-five to thirty-five pounds per cubic foot.

In testimony whereof, we hereunto set our hands.

ROY H. BROWNLEE
ROY H. UHLINGER.

Witnesses:
W. E. BALLARD,
E. B. WALTERS.